May 22, 1928.
J. C. HITCHNER
1,670,721
RESILIENT TIRE
Filed July 24, 1926
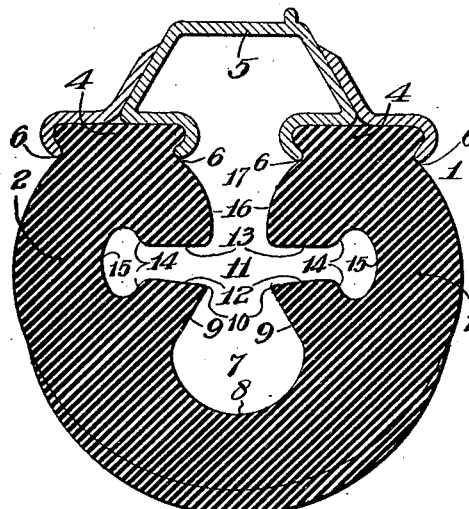
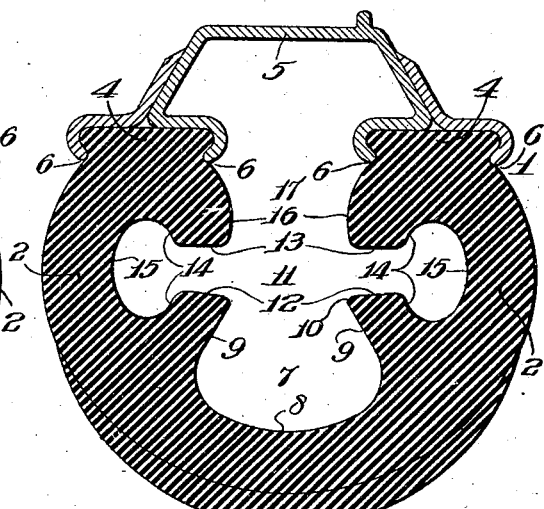
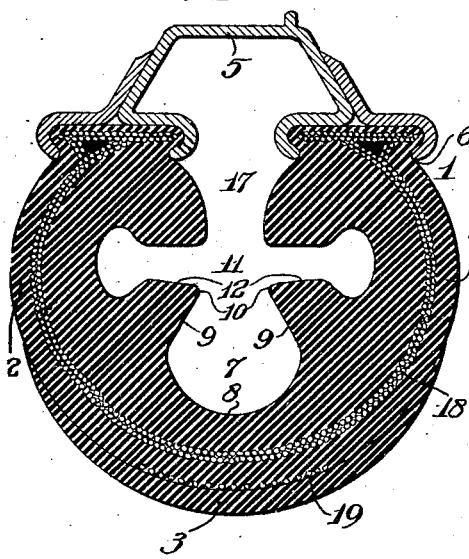
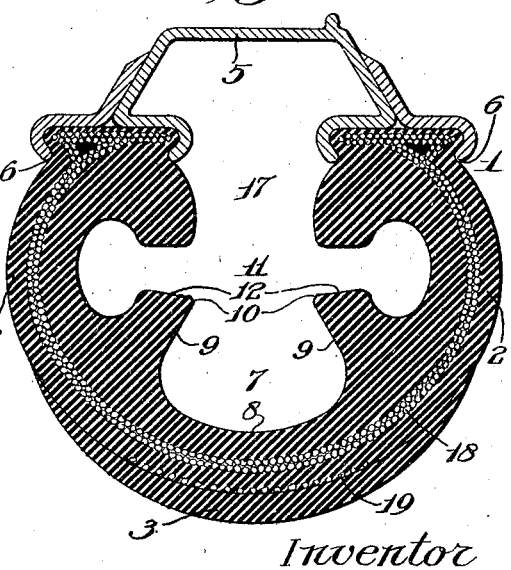
Inventor
Joseph C. Hitchner,
By
Herbert S. Fairbanks
Attorney.

Patented May 22, 1928.

1,670,721

UNITED STATES PATENT OFFICE.

JOSEPH C. HITCHNER, OF PHILADELPHIA, PENNSYLVANIA.

RESILIENT TIRE.

Application filed July 24, 1926. Serial No. 124,591.

The object of my invention is to devise a novel resilient tire which will be load sustaining and non-collapsible and which will eliminate the necessity of employing an inner inflatable tube.

A further object of the invention is to devise a novel tire which is recessed in proximity to the tread and in proximity to its transverse diameter, and which is provided with resilient abutments to prevent the collapse of the tire under abnormal loads.

A further object is to construct a tire which is non-collapsible without the use of a core and wherein the body portion or wall of the tire is reinforced by transversely and by circumferentially extending reinforcing members, such as for example fabric or cord.

With the above and other objects in view as will more clearly hereinafter appear, my invention comprehends a novel construction of a resilient tire.

Other novel features of construction and advantage will be clearly set forth in the detailed description and the appended claims.

For the purpose of illustrating the invention, I have shown in the accompanying drawings preferred embodiments which will give in practice satisfactory and reliable results. It is, however, to be understood that these embodiments are typical only and that the various instrumentalities of which my invention consists can be variously arranged and organized and still be within the spirit and scope of the invention herein disclosed.

Figure 1 is a transverse section of a resilient tire, embodying my invention.

Figure 2 is a transverse section, similar to that shown in Figure 1, but showing in addition transversely and circumferentially disposed reinforcements in the wall of the tire.

Figure 3 is a transverse section of another embodiment of my invention.

Figure 4 is a transverse section similar to that shown in Figure 3, but showing in addition transversely and circumferentially extending reinforcements in the wall of the tire.

Similar numerals of reference indicate corresponding parts.

Referring to the drawings:—

Referring first to the construction shown in Figures 1 and 2, 1 designates a resilient tire embodying my invention, and having side walls 2 and a tread portion 3 secured to its outer peripheral wall. The side walls of the tire terminate in terminal seatings 4 which are of substantial width and which interlock with and are secured in spaced relationship by a rim 5, of any desired construction and provided with clincher members which seat in the recesses 6. The tire is chambered or recessed in a novel manner to provide a desired range of resilient movements under load and to cause the tire to be load sustaining and non-collapsible.

As illustrated, an annular chamber 7 is provided in proximity to the tread zone having inwardly converging walls 9 communicating with the rounded neck 10 which connects by means of the laterally extending and preferably inclined walls 12 with one of the diverging walls 14 merging into the curved walls 15 conforming preferably to the curvature of the outer periphery of the juxtaposed side walls of the tire. The inner walls 14 merge into the laterally extending walls 13 which merge into the inwardly extending walls 16 of the chamber 17, between which and the chamber 7 is disposed the laterally disposed chamber 11.

The construction shown in Figure 2 is similar to that shown in Figure 1 except for the reinforcements, and I have, therefore, for the sake of clearness of description, identified corresponding parts by the same reference characters. I have shown in Figure 2 transversely extending reinforcements 18 in the wall of the tire from one terminal seating to the other terminal seating, and circumferentially extending reinforcements 19 in the outer wall of the tire inwardly of the tread and across the zone of road contact of the tread.

In Figures 3 and 4, I have shown a tire of the same construction as that seen in Figures 1 and 2 except that it is of larger size, with larger chambers and recesses to provide a range of resilient movements corresponding to that obtained with a balloon tire. As the construction is substantially the same as in Figures 1 and 2, I have used the same reference characters.

The walls 12 and 13 do not contact except under abnormal load, at which time resilient movements are present, not only due to the resiliency of the rubber or rubber compound of which the tire is made but also by the air pockets at the ends of the chamber 11. The chambers 7, 11 and 17 provide spaces into which the rubber may move when under load.

When the tire is under abnormal load with the walls 12 and 13 in contact, the load is carried on what may be termed a pair of spaced annular resilient and flexible bars.

The wall 12 contacting with the wall 13 at one side of the tire tends to eliminate and absorb any tendency to skid when the motor vehicle is turning sharp corners at a relatively high speed.

My present form of tire can be economically manufactured and eliminates the necessity of employing an inner tube or core as its load sustaining capacity is inherent in its construction.

Having thus described my invention what I claim as new and desire to secure by Letters Patent, is:—

1. A resilient tire load sustaining without the use of a core, having in proximity to its tread portion an annular chamber, the walls of which converge inwardly towards a laterally extending chamber, which latter is of greatest volume at its ends, and said tire having an annular chamber inwardly of said laterally extending chamber and in free communication with it.

2. A resilient tire having wide terminal seatings spaced from each other, having an annular chamber on its median line extending between its tread and rim portions, and having a transversely extending communicating chamber, said chambers being of increased width at their ends.

JOSEPH C. HITCHNER.